INVENTOR.
ALBERT ANDREWS CLARK
BY
Robert T. Dunn
ATTORNEY

INVENTOR.
ALBERT ANDREWS CLARK
BY Robert T. Dunn
ATTORNEY

June 13, 1967 A. A. CLARK 3,325,721
VARIABLE FREQUENCY CHANGER WITH MEANS FOR CONTINUOUSLY CHANGING PHASE OF THE INPUT FREQUENCY SIGNAL
Filed March 18, 1966 3 Sheets-Sheet 3
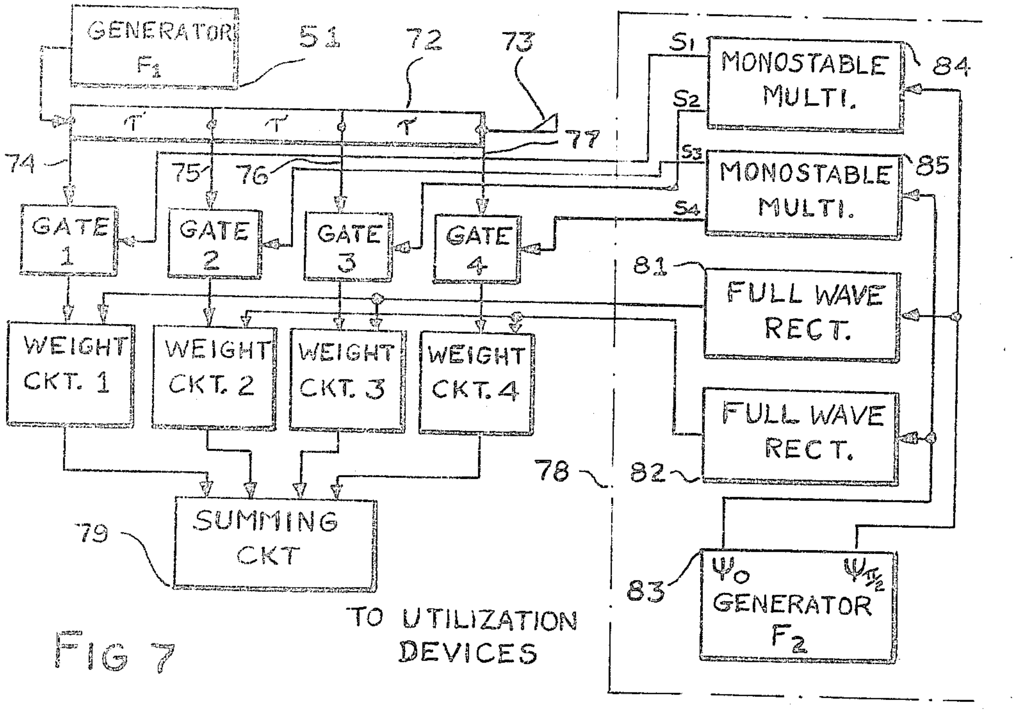
FIG 7
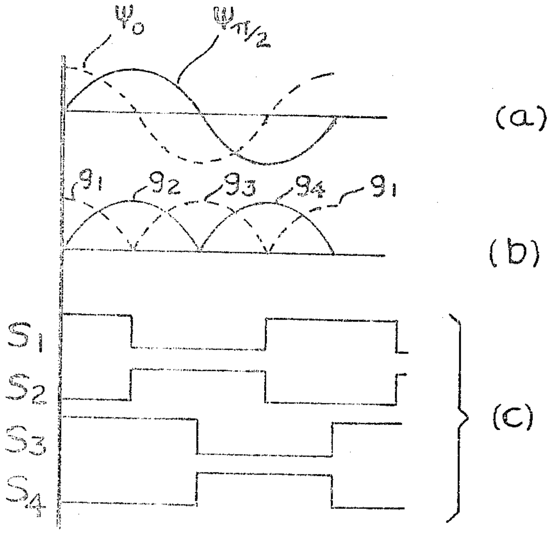
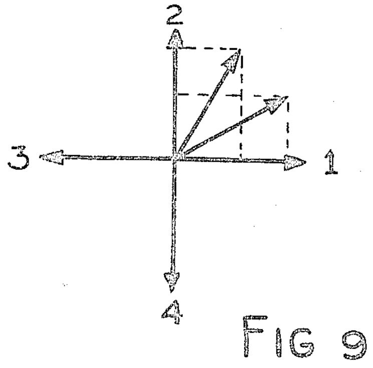
FIG 9
FIG 8
INVENTOR.
ALBERT ANDREWS CLARK
BY
Robert T. Dunn
ATTORNEY

United States Patent Office 3,325,721
Patented June 13, 1967

3,325,721

VARIABLE FREQUENCY CHANGER WITH MEANS FOR CONTINUOUSLY CHANGING PHASE OF THE INPUT FREQUENCY SIGNAL

Albert A. Clark, 0 Country Club Road, Apt. 33, Woburn, Mass. 01801

Filed Mar. 18, 1966, Ser. No. 535,581
10 Claims. (Cl. 321—60)

This invention relates to variable frequency generator systems and more particularly to a new and improved system for generating signals have selectable frequency deviation from a reference or an input frequency signal.

Several methods are known for shifting the frequency of an electromagnetic or electrical wave signal. One of these consists of effecting sequential step-wise phase shifts of the signal so that the phase of the signal is sequentially advanced or retarded. If the phase is so advanced, the frequency of the resulting fundamental signal is increased and if the phase is so retarded, the frequency of the resulting fundamental signal is decreased and the rate at which the phase is advanced or retarded over $2\pi$ radians is equal to the increase or decrease in frequency. One prior system employs a wave delay line to which the input frequency signal is applied and which provides the frequency signal in a plurality of channels connected thereto wherein the frequency signal is progressively displaced in phase (time delay) by substantially equal phase increment from one channel to the next starting from zero to 360 electrical degrees of the signal. The signals in the channels are controlled by switches which are sequentially energized so that each switch passes a given phase of the frequency signal to a summing circuit when the switch is energized. Heretofore, the technique for energizing the switches has been to energize them so that progressive phases of the frequency signal are fed to the summing network, one after another, by energizing the switches one at a time. Thus, the phase of the frequency signal in the output of the summing circuit sequentially steps in phase in discrete increments depending upon the number of channels from the delay line. This progressively stepping frequency signal includes a component at the deviated frequency which is equal to the frequency of the input signal plus the rate of phase stepping. In addition, however, numerous other frequency components are present and in many applications are undesirable, since they fall inside the useable system band and give rise to intermodulation signals. These intermodulation products cause the system error rate or false alarm rate to be excessive.

It is an object of the present invention to provide means for shifting the frequency of a signal by continuously shifting the phase of the signal.

It is another object of the invention to provide such means wherein the shifted frequency component is accompanied by substantially less undesirable frequency components than in prior systems.

It is another object of the present invention to provide means for adding cycles or subtracting cycles to a frequency signal over an extended period of time.

It is another object of the present invention to provide means for continuously shifting the phase of a frequency signal employing a multitude of sources of said frequency signal at progressive phases and in which the number of phase shift steps for each cycle of said frequency signal is greater than the number of said sources.

It is another object of the present invention to provide apparatus for shifting the frequency of a signal by producing a substantially smooth continuous shift in the phase of the signal.

It is another object of the present invention to provide apparatus for shifting the frequency of a signal over a wide range with substantially no objectionable distortions.

Briefly, in accordance with one embodiment of the present invention a multitude of initial phases of a given frequency signal are provided in different channels. The phases are preferably equally spaced and extend from zero to at least $\pi$ radiants of the frequency. Apparatus is provided for progressively combining the signals in the channels in a summing circuit so that the output from the summing circuit includes the shifted frequency. The different phases are combined to produce the shifted frequency in such a manner that the number of steps in phase taken for each cycle of the frequency signal is substantially greater than the number of different phase sources of the frequency signal. This embodiment is particularly useful insofar as smaller phase increments are possible for a given number of different phase sources of the frequency signal. The smaller phase steps result in less significant undesirable frequency components in the output of the summing circuit.

In another embodiment of the present invention the different phases of the frequency signal are combined to produce a continuous smooth shift in phase of the signal. This is accomplished by combining gated, time variant weighted values of the different phases of the frequency signal. Thus, in this embodiment, the different phases are not only combined by proper gating and keying, but, in addition, the amplitude of each is time varied so that when combined there are substantially no step-wise shifts in phase and many of the undesirable frequency components accompanying such step-wise shifts are absent.

Other objects and features of the present invention will be apparent from the following specific description taken in conjunction with the figures in which:

FIGURE 7 is a block diagram illustrating a system for producing a continuous smooth shift in the phase of the frequency signal by combining time variant weighted values of different phases of said frequency signal;

FIGURE 8 includes waveform diagrams to aid in understanding the operation of the apparatus in FIGURE 7; and FIGURE 9 is a vector diagram to illustrate the smooth shift in phase of the frequency signal accomplished with the system in FIGURE 7.

Figures 1, 2, 3, 4:
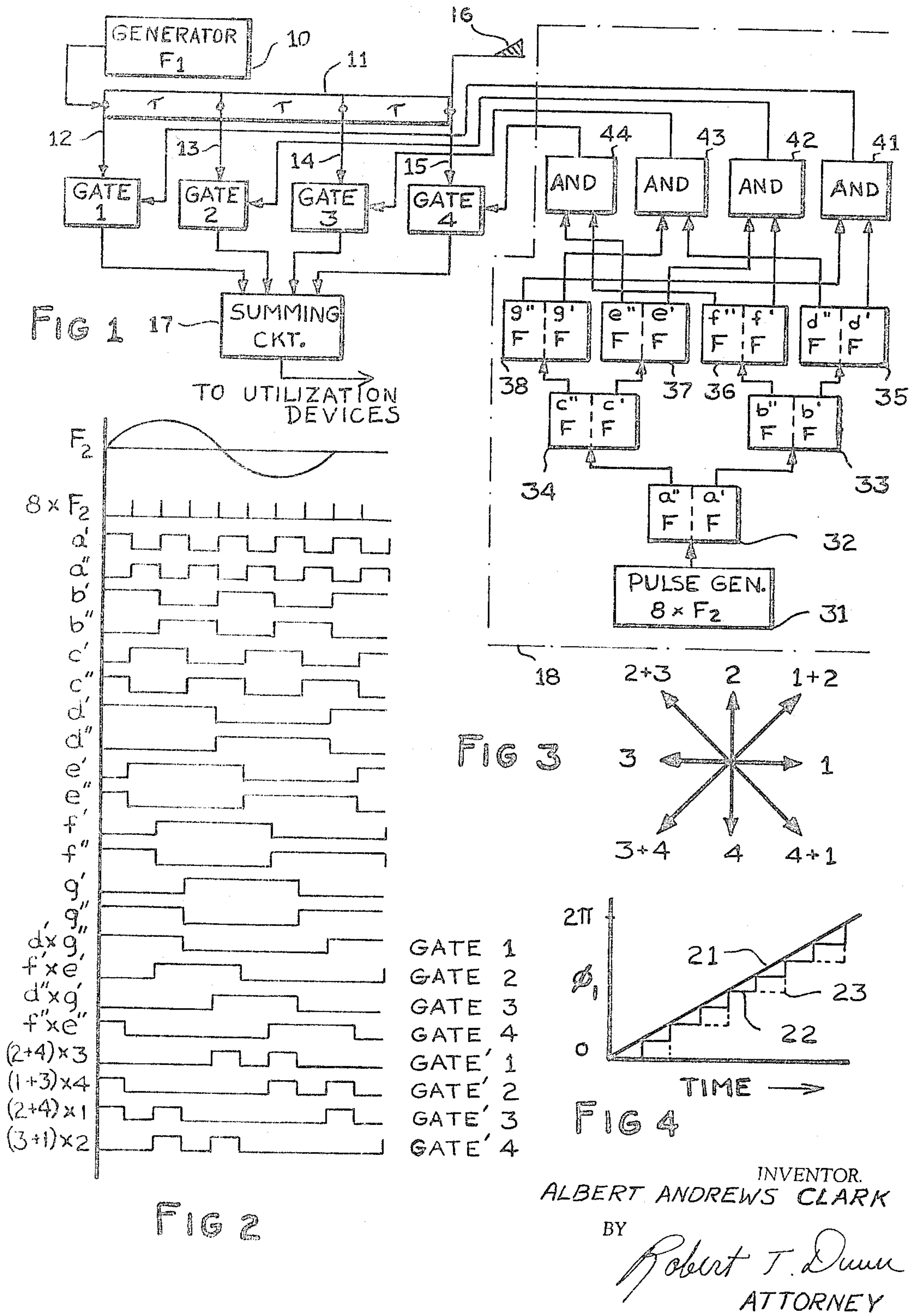
FIGURE 1 is a block diagram illustrating an electrical system for producing step-wise shifts of phase of a frequency signal.
FIGURE 2 illustrates electrical waveforms as an aid to understanding operation of the system in FIGURE 1.
FIGURE 3 is a vector diagram to illustrate the step-wise phase shifts.
FIGURE 4 is a plot of phase versus time of the frequency signal to illustrate the continuous change in phase which results in the frequency shift.

Referring first to FIGURE 1 there is shown the block diagram of an electrical system for producing continuous step-wise shifts in the phase of an input frequency signal F1 from a source such as generator 10. From this source are derived a plurality of different phases of the frequency F1 referred to herein as initial phases. The initial phases are preferably equally spaced from zero to $3\pi/2$ radians of the frequency F1. Thus, if four phases are provided they may be designated zero, $\pi/2$, $\pi$ and $3\pi/2$ radians such as represented by the unit magnitude vectors 1, 2, 3 and 4 in FIGURE 3. A convenient structure for providing these phases of the frequency signal is a non-resonant electromagnetic wave delay line 11 with taps equally spaced therealong such as taps 12 to 15 each defining a channel. The delay line is preferably non-resonant so that the frequency signal F1 is conducted therethrough as a pure traveling electromagnetic wave with no reflections and is at least ¾ of a wavelength of F1 long. In order to insure that no reflections occur, an absorbing load or matching impedance 16 is coupled to the end of the delay line.

Each of the channels 12 to 15 includes a gating circuit or switch which feeds the initial phase signal in the channel during selected intervals to the combining or summing circuit 17 which effectively adds the signals to produce the frequency shifted signal which is fed to a utilization device.

The gates denoted Gate 1 to Gate 4 in the channels 12 to 15, respectively, are controlled by signals from the overlapping gate signal generator circuit 18. These signals are included among the waveforms in FIGURE 2 and denoted Gate 1 to Gate 4. It will be noted that the gate control signals overlap in time. That is, the signal controlling Gate 1 is overlapped at its initiation by the signal controlling Gate 4 and in turn the Gate 1 signal overlaps the Gate 2 signal, the Gate 2 signal overlaps the Gate 3 signal and the Gate 3 signal overlaps the Gate 4 signal. Thus, during the period when the gate signals overlap, the phase signals from adjacent of the channels 12 to 15 are fed simultaneously to the summing circuit 17 and so the signals are added to produce during each overlapping interval an additional phase of the frequency F1. These additional phases are illustrated in the vector diagram of FIGURE 3 and denoted 1+2, 2+3, 3+4, and 4+1. As can be seen, by combining the phases in adjacent channels during the interval of overlap, the total number of phase steps accomplished in the combining circuit 17 for each cycle of the frequency F1 is twice the number of initial phases. That is, it is increased from four to eight and so the continuous step-wise phase shift of F1 is accomplished in smaller steps and is, therefore, smoother than would be obtained if there were no overlap as when the initial phases are fed to the combining circuit during separate non-overlapping intervals. This is shown clearly in FIGURE 4 which is a plot of $\phi_1$, the phase of F1, versus time. The solid line 21 represents the ideal condition; a smooth variation of $\phi_1$ with time which would produce the pure shifted frequency with no additional frequency components. The solid steps 22 represent the eight steps performed as described above with overlapping intervals during which adjacent phases are fed to the summing circuit 17 and the broken line steps 23 represent the coarser shifts that would be produced if the initial phases were not combined during overlapping intervals.

The gate signal generator 18 for generating the overlapping gating pulses is comprised for the most part of relatively simple binary circuits. For example, it includes a pulse generator 31 producing pulses at the rate eight times F2 such as shown in FIGURE 2. F2 is the selectable frequency deviation or shift desired and is also shown in FIGURE 2. The pulses control a single input bistable multivibrator or flip-flop circuit 32 the stages of which are denoted *a'* and *a''*. The pulses from stage *a'* control flip-flop 33 having two stages *b'* and *b''* and the pulses from stage *a''* control flip-flop 34 having stages *c'* and *c''*. Thus, the flip-flop circuits 33 and 34 produce pulses at twice the rate of F2. Stage *b'* of flip-flop 33 controls flip-flop 35 and stage *b''* controls flip-flop 36, while stage *c'* of flip-flop 34 controls flip-flop 37 and stage *c''* controls flip-flop 38. The output of each of the flip-flops 35 to 38 consists of pulses at the rate of F2.

The output pulses from flip-flops 35 to 38, all of which are at the rate F2, are combined as shown by AND circuits 41 to 44 to produce the Gate 1 to Gate 4 overlapping control signals. For example, the stages of flip-flops 35 to 38 are denoted *d*, *f*, *e* and *g* prime and double prime, respectively, and are such that *d'* and *g''* are combined by AND circuit 41 to produce the Gate 1 control signals,

*f'* and *e'* are combined in AND circuit 42 to produce the Gate 2 control signals, *d''* and *g'* are combined in AND circuit 43 to produce the Gate 3 control signals and *f''* and *e''* are combined in AND gate 44 to produce the Gate 4 control signals.

The overlapping intervals during which the adjacent phases of the frequency F1 are combined as demonstrated by comparison of the intervals of overlapping Gate 1 to Gate 4 control signals in FIGURE 2, illustrates but one sequence of gating, whereby the effective number of phases of the frequency F1 available for performing the step-wise phase shifts to shift frequency is increased. The additional phase signals of the frequency F1 made available by the overlap, as shown in FIGURE 3 are at amplitudes slightly greater than the initial phase signals denoted 1 to 4 and so a ripple at 4 times F1 may be produced in the output of the summing circuit 17. The ripple can be attenuated by employing a hard amplitude limiter in the output of summing circuit 17, followed by a filter to attenuate any of the ripple that remains.

Another way to reduce the ripple is to follow the summing circuit 17 with a variable attenuator controlled by the pulses from stage *a'* of a flip-flop 32. The pulses *a'* are preferably delayed a half a pulse interval before application to the variable attenuator. As an alternative, the ripple can be avoided by providing a slight modification to the system in FIGURE 1 as illustrated by the embodiment in FIGURE 5.

Figures 5, 6:
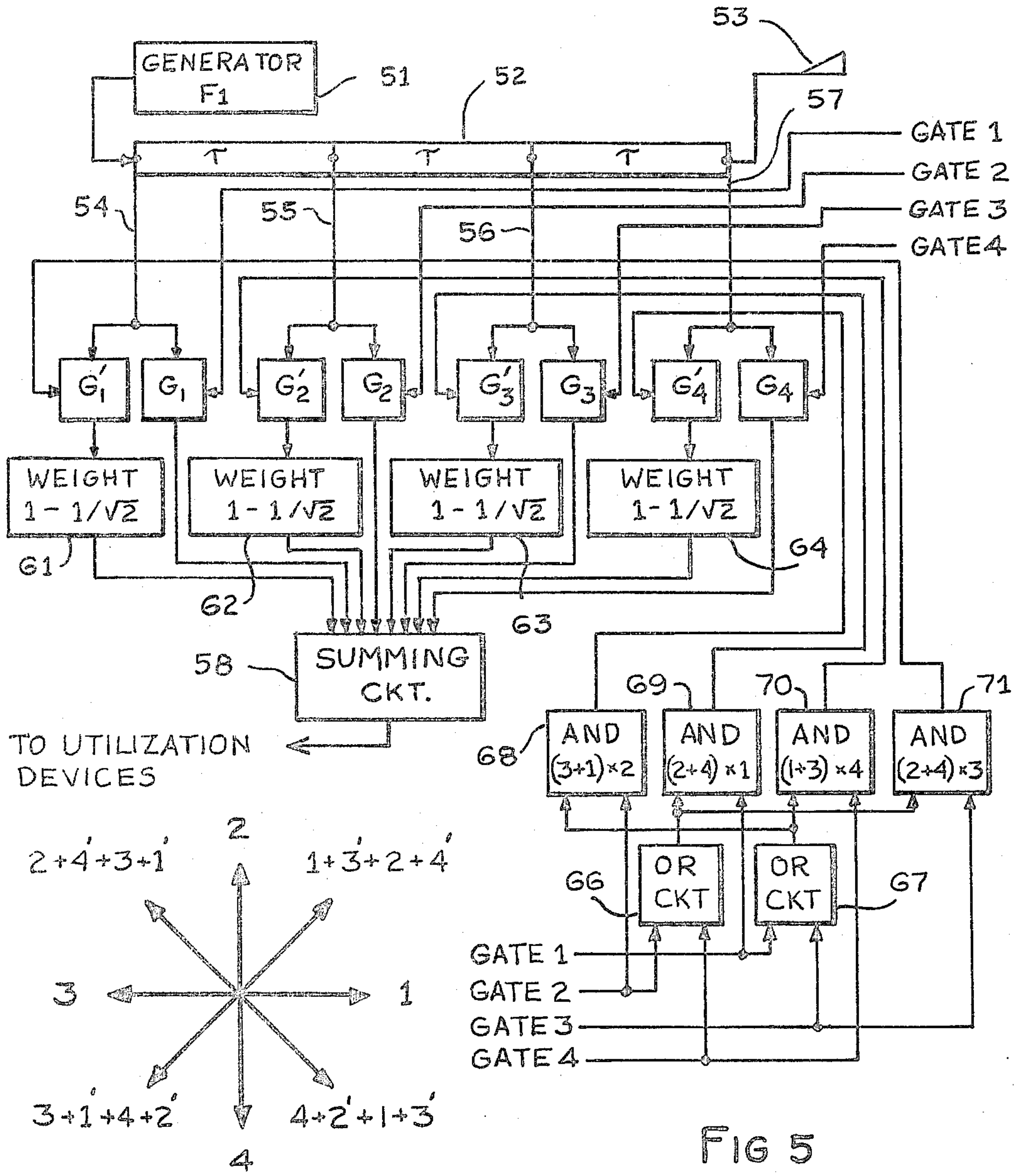
FIGURE 5 is a block diagram of a system for weighting and combining initial phases of a frequency signal to produce the shifted frequency.
FIGURE 6 is a vector diagram which aids to understand operation of the system in FIGURE 5.

The apparatus illustrated in FIGURE 5 is similar to that in FIGURE 1 insofar as it includes a generator 51 for generating the frequency F1, a delay line 52 terminating in a non-reflective load 53 and four channels 54 to 57, initiated by equally spaced taps along the delay line. Each of the channels 54 to 57 also includes a gate for feeding signals therefrom to a summing circuit 58. In addition, the gates denote G1 to G4 in the channels 54 to 57, respectively, may be controlled by the same signals denoted Gate 1 to Gate 4 in FIGURE 2. Thus, in this embodiment, the four channels 54 to 57 include in one leg thereof the gates denoted G1 to G4, respectively, which are operated just as Gates 1 to 4 in FIGURE 1 to feed initial phase signals to the summing circuit 58. In addition, the channels 54 to 57 each include a second leg made up of gates G1' to G4', respectively, and attenuating circuits 61 to 64, respectively, which also feed initial phase signals to the summing circuit 58. In operation, the gating signals denoted Gate 1 to Gate 4 are applied to the gates G1 to G4 just as in the system in FIGURE 1 and additional gating signals denoted Gate '1 to Gate '4 (shown in FIGURE 2) are applied to gates G1' to G4', respectively. The signals Gate '1 to Gate '4 are derived from signals Gate 1 to Gate 4 in accordance with the following logic:

Gate '1=(Gate 2+Gate 4)×Gate 3
Gate '2=(Gate 1+Gate 3)×Gate 4
Gate '3=(Gate 2+Gate 4)×Gate 1
Gate '4=(Gate 1+Gate 3)×Gate 2

The logic is performed by OR circuit 66 which produces (Gate 2+Gate 4) and OR circuit 67 which produces (Gate 1+Gate 3). OR circuit 66 is followed by AND gates 68 and 69 and OR circuit 67 is followed by AND gates 70 and 71. These AND gates 68 to 71 also respond to gating signals Gate 2, Gate 1, Gate 4 and Gate 3, respectively, and so they produce Gate '1 to Gate '4 set forth in the above logic.

Thus, each initial phase channel includes a leg which is gated by the gating signal associated with the channel of opposite initial phase when it is combined with the adjacent (quadrature) initial phase to produce an intermediate phase signal. Furthermore, the amplitude of the signal in the leg is diminished by the factor $1/\sqrt{2}$ before it is fed to the combining circuit 58.

The effect of the second leg in each of the channels is demonstrated by FIGURE 6. In FIGURE 6, the initial phase signals from the delay line 52 are denoted 1, 2, 3 and 4. In this embodiment, all four phase signals from the delay line combine to form the intermediate phase signal denoted 1+3′+2+4′ which falls midway between phases 1 and 2. This intermediate phase is of the same amplitude as phases 1 to 4 and so are the other intermediate phases similarly designated. As a result, the above mentioned ripple in the output of the summing circuit 17 in FIGURE 1 is avoided and does not exist in the output of summing circuit 58. Obviously, other techniques for combining fixed weighted values of the various available initial phases of the frequency F1 to produce the intermediate phase signals are possible. The embodiment in FIGURE 5 demonstrates but one technique which is an outgrowth of the structure in FIGURE 1 for combining phases. For example, additional intermediate phases could be produced by creating even more additional arms to each of the channels with gating and weighting circuits in some or all of the arms. Such systems, however, would be mere extensions of the embodiments demonstrated in FIGURES 1 to 6.

The frequency shifting systems described with reference to FIGURES 1 to 6 progressively shift frequency by incremental steps. Accordingly, the ideal frequency shift curve 21 shown in FIGURE 4 is only approximated. As the phase shift steps are made smaller by generating intermediate phases in addition to the initial phases from the delay line, the ideal curve 21 is approximated more and more closely. However, as a practical matter with the equipment usually available, a point is reached at which further reduction in the magnitude of the phase increments cannot practically be accomplished without an excess of circuitry. The system illustrated and described with reference to FIGURES 7 through 9 substantially succeeds in duplicating the ideal continuous phase shift represented by line 21 and yet avoids an excessive increase in circuitry.

The system illustrated in FIGURES 7 to 9 is similar to the system in FIGURE 1 insofar as several channels are provided, each energized by a different initial phase signal of the frequency F1 and these channels are gated during overlapping intervals. The system is also like the system in FIGURE 5, insofar as the phase signals in the channels are weighted in a predetermined manner before they are combined. The added feature in the system described in FIGURES 7 to 9 is that the weighting factor in each channel is time variant at the frequency shift F2. In addition, each gating interval is entirely overlapped, half by the preceding interval and half by the following interval. As a result, an infinite number of intermediate phases are produced between the initial phases of F1 available from the delay line. Thus, in the summing circuit the phase of F1 proceeds from one initial phase to another initial phase in a smooth transition so that substantially all undesirable frequency components in the output of the summing circuit are avoided.

As shown in FIGURE 7, the generator 51 feeds one end of delay line 72 which is loaded at the other end by a non-reflective load 73. Four equally spaced taps along the delay line 72 couple to the channels 74 to 77. Each channel includes a gate and a weighting circuit which weights the gated signal in accordance with time varying weighting signals from weighting signal generator 78. For example, channels 74 to 77 include Gate 1 to 4 and Weighting Circuits 1 to 4, respectively. The output of the Weighting Circuits are summed in the combining circuit 79 which produces a single frequency component which is the shifted frequency.

The waveforms in FIGURE 8 illustrate the time varying weighting signals and are denoted *g1* to *g4*. The weighting signals *g1* and *g3* which weight the outputs from Gates 1 and 3 in channels 74 and 76, respectively, are formed by a full wave rectified cosine wave and the weighting signals *g2* and *g4* which weight the outputs of Gates 2 and 4 in channels 75 and 77, respectively, are formed by a full wave rectified sine wave. These weighting signals are generated by full wave rectifiers 81 and 82 in the weighting signal generator, in response to quadrature components denoted $\psi\pi/2$ and $\psi_0$ of the frequency F2 from the generator 73. The same quadrature component of frequency F2, shown in FIGURE 8*a*, are also applied to multivibrators 84 and 85 in generator 78. These multivibrators are preferably of the monostable type and so each produces at one stage a gating pulse accompanying a positive excursion of the quadrature component applied to the multivibrator. For example, one stage of multivibrator 84 produces pulses represented by the waveform $S_1$ in FIGURE 8 and the other stage produces the compliment $S_2$. The other multivibrator 85 produces gate pulses $S_3$ at one stage in response to the other component of F2 and produces $S_4$, the complement, at the other stage. These gating signals S1 to S4 are applied to Gates 1 to 4, as shown in FIGURE 7, at the same time the weighting signals *g1* to *g4* are applied to Weighting Circuits 1 to 4, respectively.

In operation, the initial phase signal of frequency F1 represented by vector 1 in FIGURE 9, is fed to Weighting Circuit 1 during the interval of pulses S1 and is weighted or multiplied in Weighting Circuit 1 by the weighting signal *g1* and so a weighted value of vector 1 is fed to the summing circuit 79. At the same time, during the second half of the interval S1, gating signal S3 opens Gate 2 and phase 2 represented by vector 2 in FIGURE 9 is weighted by Weighting Circuit 2 in accordance with the time varying weighting signal *g2*. Since *g1* varies as the cosine of F2 while at the same time *g2* varies as the sine of F2 and, since, vectors 1 and 2 are orthogonal, it becomes clear that the resultant or combined signals from channels 74 and 75 derived from phases represented by vectors 1 and 2 produce a uniform magnitude vector which rotates from the position of vector 1 to the position of vector 2 in a smooth continuous change. Thus, the step from initial phase 1 to initial phase 2 is produced smoothly and continuously without any discontinuity or steps therebetween. Similarly, the initial phase signals in channels 75 and 76, channels 76 and 77 and channels 77 and 74 are combined to produce a smoothly progressing shift in the phase of the frequency F1 without the accompaniment of the undesirable components which accompany step-wise shifts in phase.

The Weighting Circuits 1 to 4 in FIGURE 7 may be simple electronic multipliers such as Hall effect device and preferably are controlled by the weighting signals such as *g1* and *g4* so that the initial phases of the signal F1 are varied as the sine or cosine of F2 as the case may be. While this condition is preferred, it is not absolutely required. For example, the weighting signals *g1* to *g4* need only approximate the rectified sine or cosine wave and yet results satisfactory for some applications will be produced. Since each of the initial phases are gated during the weighting interval, it is not necessary that the weighting signal attenuate to zero at each end of an interval; the gating interval provides this function. For some applications, it is only necessary that the weighting signal simply increase from the beginning to the middle of the corresponding gating interval and then decrease from the middle to the end of the same interval. In such cases, the sine or cosine function of the weighting signal is approximated.

A rigorous mathematical analysis of the systems described above with reference to FIGURES 7 to 9 is offered below. Consider the delay line 72 as producing a signal delay $\tau$ between each channel tap. Designate the initial phases as $e_1(t)$, $e_2(t)$, $e_3(t)$ and $e_4(t)$. Consider also the corresponding weighting functions for each of these initial phases as $g_1(t)$, $g_2(t)$, $g_3(t)$ and $g_4(t)$. Now, if $2\Delta t$ is the interval of each gating signal then $$g_1(t)=\begin{cases}\cos\frac{\pi t}{2\Delta t} & -\Delta t\leq t\leq \Delta t\\ 0 & \text{otherwise for } \Delta t< t\leq 3\Delta t\end{cases}$$

Accordingly it follows that:

$$g_2(+)=g_1(t-\Delta t)$$
$$g_3(t)=g_1(t-2\Delta t)$$
$$g_4(t)=g_1(t-3\Delta t)$$

Let $G_1(t)$, $G_2(t)$, $G_3(t)$ and $G_4(t)$ represent the successive intervals during which the adjacent principle phases are combined; thus, $$G_1(t)=g_1e_1+g_2e_2 \text{ and } 0\leq t<\Delta t$$
$$G_2(t)=g_2e_2+g_3e_3 \text{ and } t\leq t<2\Delta t$$
$$G_3(t)=g_3e_3+g_4e_4 \text{ and } 2\Delta t\leq t<3\Delta t$$
$$G_4(t)=g_4e_4+g_1e_1 \text{ and } 3\Delta t\leq t<4\Delta t$$

and so the output of the combining circuit 69 denoted $e_{out}$, is as follows: $e_{out}=G_1+G_2+G_3+G_4$ Now if the signal from generator 61 denoted $e_{in}$ is expressed as follows $e_{in}=\exp j\omega_1 t$, where $\omega_1=2\pi F1t$, then it follows that:

$$e_1=\exp j\omega_1 t$$
$$e_2=\exp j(\omega_1 t+\pi/2)$$
$$e_3=\exp j(\omega_1 t+\pi)$$
$$e_4=\exp j(\omega_1 t+3\pi/2)$$

With some manipulation of the above expressions for $e_1$ to $e_4$ and in view of the relationship between the functions $g_n(t)$, it can be shown that $G_n$ is in the form:

$$\exp j2\pi(F1+1/4\Delta t)t \text{ and } n=1, 2, 3, 4$$

It follows from this that the expression for the output $e_{out}$ is in the form:

$$\exp j2\pi(F1+\tfrac{1}{4}\Delta t)t$$

An inspection of the above equation reveals that the output consists of a pure frequency shift. There are no sidebands in the output spectrum; it is a single tone shifted in frequency by $\frac{1}{4}\Delta t$ cycles per second. The important consideration of this optimum condition is that the typical weighting function $g_n(t)$ varies in a sinusoidal fashion and that two of the initial phases from the delay line are sampled at all times.

This completes description of a number of embodiments of the present invention by which the frequency of a signal is shifted by shifting the phase of the signal employing a fixed relatively small number of initial phases of the frequency signal which are combined in a number of different ways to produce intermediate stepped phases or a smooth shifting of phase between the initial phases, thereby, to reduce the number and magnitude of undesirable frequency components which generally accompany a stepwise phase shifted frequency signal. The various embodiments described herein are made by way of example and are not intended to limit the spirit and scope of the invention as set forth in the accompanying claims.

What is claimed is:

1. A system for generating an output electromagnetic wave signal having a predetermined frequency deviation from an input electromagnetic wave signal comprising,
   means responsive to said input signal for producing a plurality of different initial phase signals of said input frequency,
   means for combining signals of different phase to produce a signal of another phase lying between the phases of said phase signals combined therein,
   means for periodically sampling two or more of said different initial phase signals during overlapping time intervals and means for coupling said sampled phase signals to said combining means to produce additional phases of said input frequency signal in the output thereof,
   said initial phases, said combining means and said coupling means being such that said system produces said output signal by continually shifting phase of said input frequency signal.

2. A system as in claim 1 and in which,
   said initial phase signals of said input frequency are produced in separate electrical channels each of which is coupled to said combining means by a separate gating circuit and
   means are provided for controlling said gating circuits so that said initial phase signals of said input frequency are periodically coupled to said combining means at the rate of said frequency deviation during said overlapping time intervals of consecutive initial phases.
3. A system as in claim 1 and in which,
   said initial phase signals of said input frequency are at equally spaced phase intervals extending over at least one half cycle of said input frequency signal.
4. A system as in claim 2 and in which,
   each of said separate channels includes means for weighting the corresponding initial phase signal and
   means for controlling said gating circuits to couple said weighted initial phase signal to said combining means during the same time interval that the initial phase signal of opposite phase is fed to said combining means,
   said weighting and said combining means being such that said additional phase signals produced by each combination have the same amplitude in said output as said initial phase signals in said output.
5. A system as in claim 2 and further including,
   means for producing time varying weighting signals and
   means responsive thereto in each of said channels for weighting each of said initial phase signals in accordance with one of said time varying weighting signals.
6. A system as in claim 5 and in which,
   said time varying weighting signals are sinusoidal at said predetermined deviation frequency.
7. A system as in claim 6 and in which,
   said initial phase signals which are sinusoidally weighted and simultaneously combined are in quadrature phase relationship to each other.
8. A system as in claim 5 and in which,
   said time varying weighting signals which control weighting of different initial phase signals overlap each other in time.
9. A system as in claim 6 and in which,
   said sinusoidal weighting signals are the rectified positive excursions of a sinusoidal wave at the same frequency as said predetermined frequency deviation and are coincident with the interval of the corresponding initial phase signal whose weighting is controlled by said weighting signal.
10. A system as in claim 6 and in which,
   each of said weighted initial phase signals of said input frequency are coupled to said combining means by the gating circuit in the same channel at the same time as the preceding initial phase signal and at the same time as the following initial phase signal,
   whereby said weighted phase signals combine to produce in said output a smooth continuous shift in the phase of said input frequency.

References Cited

UNITED STATES PATENTS

| | | | |
|---|---|---|---|
| 2,666,181 | 1/1954 | Courtillot | 332—27 X |
| 2,923,891 | 2/1960 | Nicholson | 332—16 |
| 2,972,109 | 2/1961 | Nicholson | 328—15 |
| 3,026,475 | 3/1962 | Applebaum | 332—16 X |

JOHN F. COUCH, *Primary Examiner.*

G. GOLDBERG, *Assistant Examiner.*